United States Patent
Burns et al.

(10) Patent No.: US 9,074,155 B2
(45) Date of Patent: *Jul. 7, 2015

(54) PERFLUOROPOLYETHER LUBRICANT AND SYSTEMS COMPRISING SAME

(71) Applicant: HGST Netherlands B.V., Amsterdam (NL)

(72) Inventors: John M. Burns, San Jose, CA (US); Hong Deng, San Jose, CA (US); Xing-Cai Guo, Tracy, CA (US); Bruno Marchon, Palo Alto, CA (US); Daryl J. Pocker, San Jose, CA (US); Robert Waltman, Gilroy, CA (US)

(73) Assignee: HGST NETHERLANDS B.V., Amsterdam (NL)

( * ) Notice: Subject to any disclaimer, the term of this patent is extended or adjusted under 35 U.S.C. 154(b) by 0 days.

This patent is subject to a terminal disclaimer.

(21) Appl. No.: 13/954,724

(22) Filed: Jul. 30, 2013

(65) Prior Publication Data
US 2013/0317257 A1 Nov. 28, 2013

Related U.S. Application Data

(62) Division of application No. 12/760,877, filed on Apr. 15, 2010, now Pat. No. 8,518,564.

(51) Int. Cl.
*G11B 5/66* (2006.01)
*C10M 107/38* (2006.01)
*C08G 65/00* (2006.01)
*C09D 171/00* (2006.01)
*G11B 5/725* (2006.01)

(52) U.S. Cl.
CPC ......... *C10M 107/38* (2013.01); *Y10T 428/1164* (2015.01); *C08G 65/007* (2013.01); *C08G 2650/48* (2013.01); *C09D 171/00* (2013.01); *G11B 5/725* (2013.01)

(58) Field of Classification Search
None
See application file for complete search history.

(56) References Cited

U.S. PATENT DOCUMENTS

| | | |
|---|---|---|
| 4,666,781 A | 5/1987 | Lehner |
| 4,942,203 A | 7/1990 | Conti-Ramsden et al. |
| 5,082,714 A | 1/1992 | Yanai et al. |
| 5,107,033 A | 4/1992 | Pechhold |
| 5,320,769 A | 6/1994 | Kinoshita et al. |
| 5,539,059 A | 7/1996 | Bierschenk et al. |

(Continued)

FOREIGN PATENT DOCUMENTS

| | | |
|---|---|---|
| JP | 59-111818 | 6/1984 |
| JP | 2001055440 | 2/2001 |

(Continued)

OTHER PUBLICATIONS

Lei et al., "Thermal stability of Fomblin Z and Fomblin Zdol thin films on amorphous hydrogenated carbon", Tribology Letters, vol. 11, No. 1, Mar. 2001, pp. 1-5.*

(Continued)

*Primary Examiner* — Holly Rickman

(57) ABSTRACT

A surface agent includes two end portions and a middle portion disposed between the end portions. The end portions include a terminal section and a midsection. The terminal section includes at least one surface active functional group. The midsection includes at least one perfluoroethyl ether unit. The middle portion includes at least one perfluorobutyl ether unit.

7 Claims, 3 Drawing Sheets

(56) References Cited

U.S. PATENT DOCUMENTS

| | | |
|---|---|---|
| 5,663,127 A | 9/1997 | Flynn et al. |
| 6,080,486 A | 6/2000 | Falcone et al. |
| 6,162,521 A | 12/2000 | Falcone |
| 6,570,041 B1 | 5/2003 | Kodama et al. |
| 6,579,835 B2 | 6/2003 | Scicchitano et al. |
| 6,608,009 B2 | 8/2003 | Akada et al. |
| 6,660,886 B1 | 12/2003 | Liu et al. |
| 7,683,012 B2 | 3/2010 | Burns et al. |
| 8,518,564 B2 * | 8/2013 | Burns et al. ............ 428/835.8 |
| 2005/0037932 A1 | 2/2005 | Liu et al. |
| 2007/0060487 A1 | 3/2007 | Burns et al. |
| 2007/0203037 A1 | 8/2007 | Chiba et al. |
| 2007/0224452 A1 | 9/2007 | Sasa et al. |
| 2007/0225183 A1 | 9/2007 | Sasa et al. |
| 2008/0132664 A1 | 6/2008 | Shirakawa et al. |
| 2008/0176106 A1 | 7/2008 | Guo et al. |
| 2009/0075123 A1 | 3/2009 | Lieu et al. |
| 2009/0154010 A1 | 6/2009 | Ooeda et al. |
| 2010/0069275 A1 | 3/2010 | Marchionni et al. |
| 2010/0240559 A1 | 9/2010 | Shirakawa |
| 2011/0256424 A1 | 10/2011 | Burns et al. |
| 2012/0282491 A1 | 11/2012 | Burns et al. |

FOREIGN PATENT DOCUMENTS

| | | |
|---|---|---|
| JP | 2003162810 A | 6/2003 |
| JP | 2006070173 A | 3/2006 |
| JP | 2007016124 A | 1/2007 |
| JP | 2009197210 A | 9/2009 |
| JP | 2009245492 A | 10/2009 |
| WO | 2008038799 A1 | 4/2008 |
| WO | 2008065165 | 6/2008 |
| WO | 2009013785 A1 | 1/2009 |
| WO | 2009093665 | 7/2009 |
| WO | 2009122988 A1 | 10/2009 |
| WO | 2009123052 A1 | 10/2009 |

OTHER PUBLICATIONS

X.-C. Guo et al., "Multidentate functionalized lubricant for ultralow head/disk spacing," Journal of Aplied Physics 100, 044306, Aug. 21, 2006, 8 pages.

"Development of Novel Lubricants for Ultra Low Flying Height," Fujitsu (magazine) 58,1, pp. 48-52, Jan. 2007.

Hiroshi Chiba et al., "Synthesis of Tri-functional PFPE Lubricant and Its Spreading Characteristics on a Hard Disk Surface," 2004 Symposium on Micro-Nancmechatronics and Human Science, Published Oct. 31-Nov. 3, 2004, pp. 261-264.

Nikles et al, Amine Quinone Polyuretnanes . . . Department of Chemistry and Center for Materials for Information Technology, University of Alabama, Tuscaloosa, Alabama 35487-0336, 1998, Journal of Polymer Science Part A: Polymer Chemistry, vol. 37 (1999), pp. 2339-2345.

Kim et al, Biodegradable Photo-crosslinked poly(ether-ester) Networks for Lubricious Coatings, Department of Chemical Engineering, Massachusetts Institute of Technology, Cambridge, MA 01239, 1998, Biomaterials 21 (2000), pp. 259-265.

Ge et al, Synthesis and Characterization of a New Fluorinated Polyether Glycol Prepared by Radical Grafting of Hexafluoropropylene Onto Polytetramethylene Glycol, Department of Polymer Science and Engineering, University of Science and Technology of China, Heifi 230026m 2005, European Polymer Journal 42 (2006), pp. 395-401.

* cited by examiner

PERFLUOROPOLYETHER LUBRICANT AND SYSTEMS COMPRISING SAME

This application is a Divisional of U.S. Utility patent application Ser. No. 12/760,877, filed Apr. 15, 2010, which is incorporated herein by reference in its entirety.

BACKGROUND

1. Field of Disclosure

The invention is generally related to lubricants and, in particular, to perfluoropolyether lubricants for magnetic media disks in hard disk drive applications.

2. Description of Related Art

Lubricants, such as boundary lubricants, are used in many types of mechanical devices including disk drives and microelectronic mechanical systems. Such devices typically include a moving part that is lubricated to prevent wear. The moving part moves relative to other parts of the device. Boundary lubricants form a lubricating film when functional groups of the lubricant attach to the surface being lubricated. Boundary lubricants, among other advantages, limit solid-to-solid contact.

In an effort to increase disk drive capacity, industry is seeking to reduce flying height. However, lower flying height can induce severe slider/lubricant interactions. For example, slider/lubricant interactions can create moguls, ripples, and depletion in the lubricant on the surface. In addition, lubricant can gather on a leading edge of the slider, forming drops that fall onto the disk surface, leaving thick regions. As a result, the thicker regions, moguls, and ripples can cause errors in reading the disk, whereas regions without lubricant may permit surface scratching in the disk or damage to the head of the disk drive.

SUMMARY

Embodiments of a perfluoropolyether surface agent and systems incorporating same are disclosed. The surface agent includes segments of perfluoropolyalkyl ether and segments having surface active functional groups. In a particular example, the surface agent includes at least one perfluoropolyalkyl ether segment including perfluorobutyl ether units and at least one perfluoropolyalkyl ether segment including perfluoroethyl ether units. The surface agent may be placed on a media disk comprising a substrate and a magnetic recording layer, and a carbon overcoat layer, with the lubricant on the overcoat layer. In other embodiments, a hard disk drive comprises an enclosure, a disk rotatably mounted to the enclosure and having a substrate with a magnetic recording layer, and an actuator movably mounted to the enclosure and having a head for reading data from the disk, with the surface agent on the disk. The surface agent also may be used on other mechanical devices comprising a movable part subject to wear, with the movable part being lubricated with the surface agent including at least one perfluoropolyalkyl ether segment including perfluorobutyl ether units and at least one perfluoropolyalkyl ether segment including perfluoroethyl ether units.

The foregoing and other objects and advantages of the present invention will be apparent to those skilled in the art, in view of the following detailed description of the present invention, taken in conjunction with the appended claims and the accompanying drawings.

BRIEF DESCRIPTION OF THE DRAWINGS

So that the manner in which the features and advantages of the embodiments are attained and can be understood in more detail, a more particular description of the embodiments briefly summarized above may be had by reference to the appended drawings. However, the drawings illustrate only some embodiments and therefore are not to be considered limiting of the scope of the invention which may admit to other equally effective embodiments.

The use of the same reference symbols in different drawings indicates similar or identical items.

DETAILED DESCRIPTION

Figure 1:
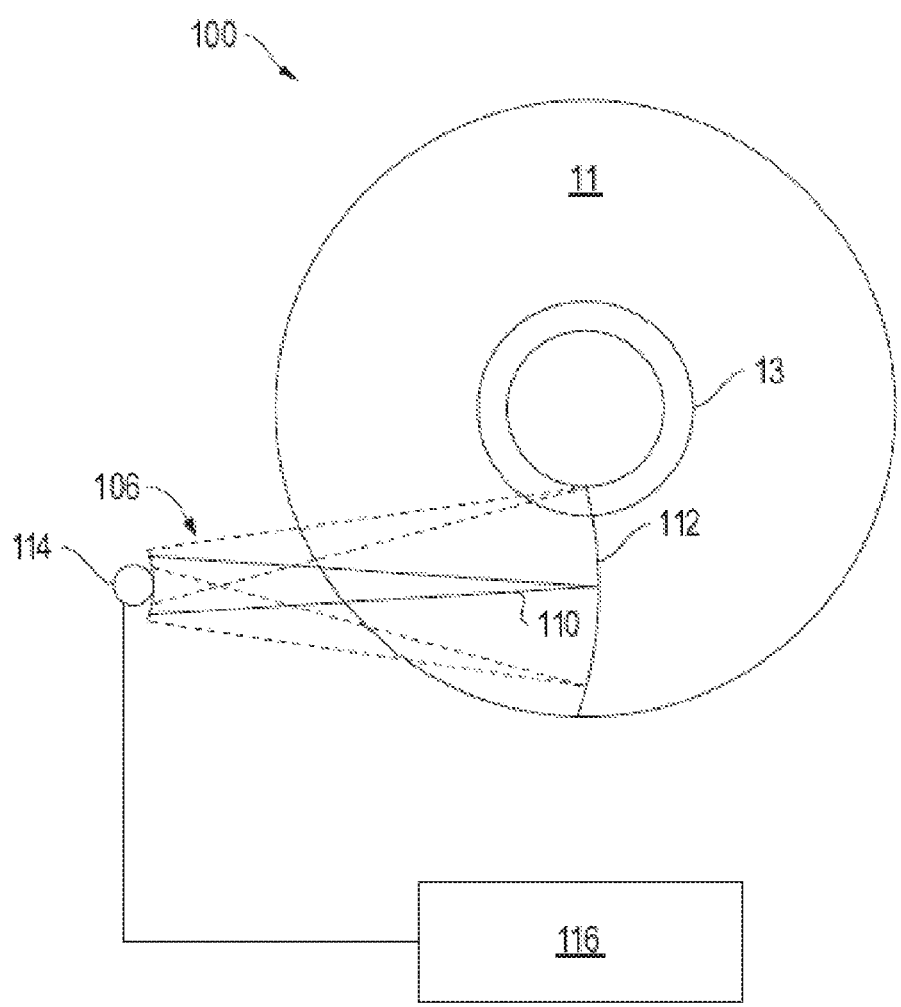
FIG. 1 includes a schematic diagram of one embodiment of a disk drive.

In an exemplary embodiment, a surface agent includes segments of perfluoropolyalkyl ether and segments having surface active functional groups. In a particular example, the surface agent includes at least one perfluoropolyalkyl ether segment including perfluorobutyl ether units and at least one separate perfluoropolyalkyl ether segment including perfluoroethyl ether units. When disposed on a surface, the surface agent may act as a lubricant where the surface active functional groups may bond to the surface and the perfluoropolyalkyl ether segments form a low surface energy region above the surface. In a particular embodiment, the surface may be part of a magnetic storage device.

In an exemplary method, a storage device is formed by dispensing magnetic media having a magnetic surface and applying a surface agent to the magnetic surface. The surface agent may be applied by dip coating, spray coating, spin coating, a vapor deposition technique, or any combination thereof.

In an example, the surface agent includes a middle portion ($R_m$) bonded between two end portions ($R_e$) as illustrated in formula 1.

$$R_e-R_m-R_e \quad (1)$$

As used herein, the terms "portion," "segment," or "section" refer to extents along a backbone or primary chain length of a molecule, typically formed of a chain of carbon and oxygen atoms. Functional groups, such as polar functional groups may extend from carbons bound within the backbone or primary chain of the surface agent molecule.

In an example, the middle portion ($R_m$) includes a section formed of perfluoropolyalkyl ether units, such as perfluorobutyl ether units. On either side of the segment of perfluoropolyalkyl ether units, fluoroalkyl ether units or alkyl ether units may be bonded to facilitate further bonding to other sections of the middle portion ($R_m$) or the end portions ($R_e$). For example, the middle portion ($R_m$) can include a segment illustrated as formula 2:

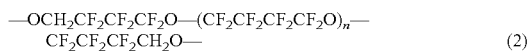

$$-OCH_2CF_2CF_2CF_2O-(CF_2CF_2CF_2CF_2O)_n- \\ CF_2CF_2CF_2CH_2O- \quad (2)$$

wherein n is at least 1 on average. For example, n may be in a range of 1 to 6, such as a range of 1 to 4. In other words, the perfluoropolyalkyl ether segment of the middle portion ($R_m$) can include between one and six perfluorobutyl ether units ($CF_2CF_2CF_2CF_2O$), such as between one and four perfluorobutyl ether units.

The end portions ($R_e$) can include a perfluoropolyalkyl ether segment, such as a segment including perfluoroethyl ether units. In a particular example, the end portions ($R_e$) include a segment of the formula 3:

$$R_e—R_z—R_t \quad (3)$$

wherein the midsection ($R_z$) includes a segment including perfluoropolyethyl ether, such as the segment illustrated in formula 4:

$$—OCH_2CF_2O—(CF_2CF_2O)_m—CF_2CH_2O— \quad (4)$$

wherein m is at least 1 on average. For example, m may be in a range of 2 to 6. In other words, the midsection ($R_z$) can include at least one perfluoroethyl ether unit ($CF_2CF_2O$), such as at least two perfluoroethyl ether units. In particular, the midsection ($R_z$) can include between two and six perfluoroethyl ether units, such as between two and four perfluoroethyl ether units. In a particular example, the midsection ($R_z$) includes a perfluoropolyalkyl ether segment that is free of perfluoromethyl ether units and can consist essentially of perfluoroethyl ether units, being more rigid than perfluoropolyalkyl ether segments that include flexible components, such as perfluoromethyl ether units.

As illustrated in formula 3, the end portions ($R_e$) can also include a terminal section ($R_t$). The terminal section includes at least one surface active functional group which interacts with and can bond to a surface to be lubricated by the surface agent. In an example, the at least one surface active functional group is a polar functional group. The terminal section ($R_t$) can include more than one surface active functional group, such as at least two surface active functional groups, or even at least three surface active functional groups. In an example, the terminal section ($R_t$) includes a surface active functional group such as a hydroxyl group, a piperonyl group, an amine group, a phosphazene group, or a combination thereof. In particular, the terminal section ($R_t$) includes at least one hydroxyl group, such as at least two hydroxyl groups. In a further example, the terminal section ($R_t$) may be a segment of the formula 5

$$HOCH_2CH(OH)CH_2— \quad (5)$$

Further, the end portions ($R_e$) can include an intermediate segment ($R_i$). The intermediate section ($R_i$) is bound between the midsection ($R_z$) of the end portions ($R_e$) and the middle portion ($R_m$). In an example, the intermediate section ($R_i$) can include at least one surface active functional group. For example, the intermediate section ($R_i$) can include at least two surface active functional groups. In particular, the surface active functional group may be a polar functional group. For example, the surface active functional group may be a hydroxyl group, a piperonyl group, an amine group, a phosphazene group, or a combination thereof. In a particular example, the intermediate section ($R_i$) includes at least one hydroxyl group, such as at least two hydroxyl groups. An exemplary intermediate section ($R_i$) may have the formula:

$$—CH_2CH(OH)CH_2OCH_2CH(OH)CH_2— \quad (6)$$

The end portions ($R_e$) may be bonded to the middle portion ($R_m$) by alkylether units or fluoroalkyl ether units. As a result, an exemplary surface agent may have the general formula (formula 7) in which a middle portion of the backbone includes a segment of perfluoropolybutyl ether separated from two end portions that each includes a segment of perfluoropolyethyl ether and terminal groups including polar hydroxyl functional groups.

$$HOCH_2CH(OH)CH_2OCH_2CF_2O—(CF_2CF_2O)_m—*$$
$$*CF_2CH_2OCH_2CH(OH)CH_2OCH_2CH(OH)$$
$$CH_2OCH_2CF_2CF_2CF_2O(CF_2CF_2CF_2CF_2O)_n**$$
$$**CF_2CF_2CF_2CH_2OCH_2CH(OH)CH_2OCH_2CH$$
$$(OH)CH_2OCH_2CF_2O* *(CF_2CF_2O)_m—$$
$$CF_2CH_2OCH_2CH(OH)CH_2OH \quad (7)$$

wherein n and m are at least 1 on average.

In an exemplary embodiment, the surface agent has an average molecular weight of at least 1000 amu. Owing to the nature of the synthesis chemistry, the surface agent may have a distribution of molecular weights. As used herein, the average molecular weight is the weight average molecular weight. In an example, the average molecular weight of the surface agent is in a range of 1000 amu to 5000 amu. For example, the average molecular weight may be in a range of 1000 amu to 3000 amu, such as a range of 1250 amu to 2500 amu, or even a range of 1500 amu to 2250 amu.

In an example, the surface agent can be formed by linking end portions using a middle portion. The end portions may be formed by adding terminal groups on to a perfluoropolyalkyl ether segment. In a particular example, hydroxyl containing segments may be added on to the ends of the perfluoropolyalkyl ether segment, for example, as described in U.S. Patent Application Publication No. 2007/0225183 A1. A middle portion formed of a perfluoropolyalkyl ether segment can be linked between two end portions. For example, the middle portion can be synthesized to include epoxide end groups and reacted with the end portions as described, for example, in U.S. Pat. No. 7,683,012 B2 or Guo et al. "Multidenate functionalized lubricant for ultralow head/disk spacing disk drive," *J. Applied Physics,* 100, 044306 (2006).

Following the synthesis reaction, the surface agent can be separated from other reaction byproducts through fractionation or other separation techniques. As a result, a surface agent having the average molecular weight described above can be obtained.

As described below in Example 1, the surface agent exhibits desirable properties such as Clearance Index, Bonded Ratio, and Durability Index. The Clearance Index, as defined in Example 1, is the difference in thermal flying height control (TFC) clearance relative to the TFC clearance of a ZTMD lubricant described in U.S. Pat. No. 7,683,012 B2. In an example, the Clearance Index of the surface agent is at least 0.4 nm, such as at least 0.6 nm, or even at least 0.7 nm.

The surface agent also exhibits a desirable Bonded Ratio, defined below in Example 1 as the stabilized fraction of bonded molecules remaining after exposure to a solvent as determined by the method of Example 1. For example, the Bond Ratio may be at least 80%, such as at least 85%.

Further, the surface agent exhibits a desirable Durability Index, defined below in Example 1 as the time-to-failure determined by the method described in Example 1. For example, the Durability Index may be at least 3000 seconds, such as at least 4000 seconds, or even at least 4200 seconds.

To facilitate bonding to a surface, the surface agent may be incorporated into a coating solution. For example, the coating solution can include a solvent and the surface agent. An exemplary solvent includes a fluorinated solvent (2,3-dihydroperfluoropentane). The coating solution can include at least 0.01 g/l of the surface agent, such as at least 0.05 g/l of the surface agent, at least 0.5 g/l of the surface agent, or even at least 1 g/l of the surface agent.

In an example, the surface agent can form a lubricating layer over a component of a storage device. Referring now to FIG. 1, a schematic diagram of an embodiment of a hard disk drive assembly 100 is shown. A hard disk drive assembly 100 generally comprises a housing or enclosure with one or more disks as described herein. The disk comprises magnetic recording media 111, rotated at high speeds by a spindle motor (not shown) during operation. The concentric data tracks 113 are formed on either or both disk surfaces magnetically to receive and store information.

Embodiments of a read or read/write head 110 may be moved across the disk surface by an actuator assembly 106, allowing the head 110 to read or write magnetic data to a particular track 113. The actuator assembly 106 may pivot on a pivot 114. The actuator assembly 106 may form part of a closed loop feedback system, known as servo control, which dynamically positions the read/write head 110 to compensate for thermal expansion of the magnetic recording media 111 as well as vibrations and other disturbances. Also involved in the servo control system is a complex computational algorithm executed by a microprocessor, digital signal processor, or analog signal processor 116 that receives data address information from an associated computer, converts it to a location on the magnetic recording media 111, and moves the read/write head 110 accordingly.

In some embodiments, read/write heads 110 periodically reference servo patterns recorded on the disk to ensure accurate head 110 positioning. Servo patterns may be used to ensure a read/write head 110 follows a particular track accurately, and to control and monitor transition of the head 110 from one track 113 to another. Upon referencing a servo pattern, the read/write head 110 obtains head position information that enables the control circuitry 116 to subsequently realign the head 110 to correct any detected error.

Servo patterns may be contained in engineered servo sectors 112 embedded within a plurality of data tracks 13 to allow frequent sampling of the servo patterns for improved disk drive performance, in some embodiments. In a typical magnetic recording media 111, embedded servo sectors 112 extend substantially radially from the center of the magnetic recording media 11, like spokes from the center of a wheel. Unlike spokes however, servo sectors 112 form a subtle, arc-shaped path calibrated to substantially match the range of motion of the read/write head 110.

In an example, the storage device can be formed by dispensing a component having a magnetic surface and depositing a surface active agent on the magnetic surface. For example, depositing the surface active agent can include dip coating, spin coating, spray coating, a vapor deposition technique, or any combination thereof. In a particular example, the surface agent may form a layer having a thickness in a range of 7 Å to 20 Å, such as a thickness in a range of 10 Å to 17 Å.

EXAMPLE

A surface agent having an approximate structure of formula 7 above is prepared and tested relative to ZTMD lubricant described in U.S. Pat. No. 7,683,012 B2.

Figure 2:
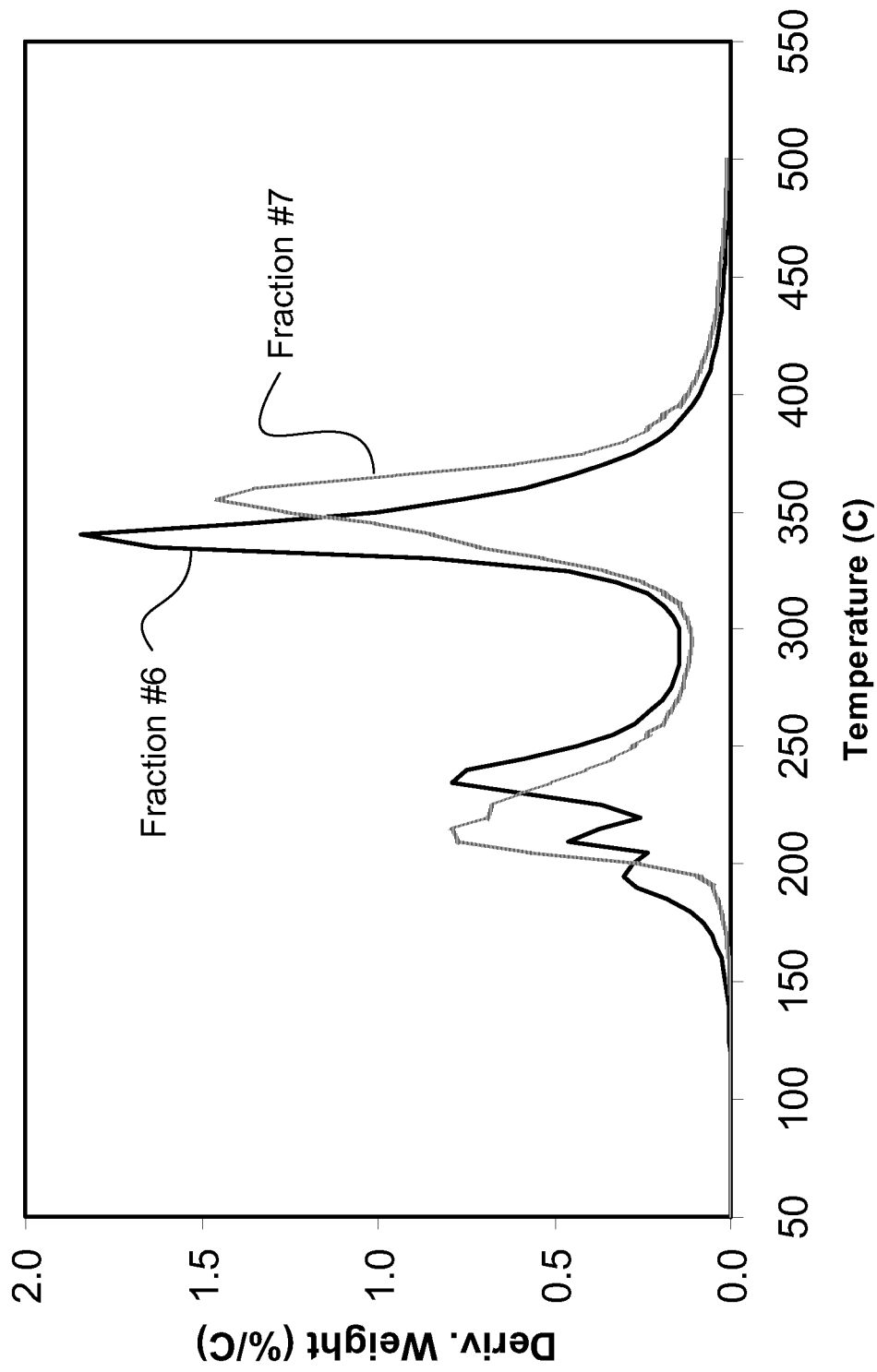
FIG. 2 includes a thermal gravimetric analysis of exemplary surface agents.

A solution of reactants and byproducts formed from linking a middle portion including a perfluoropolybutyl ether segment to end portions including a perfluoropolyethyl ether segment is fractionated to separate the surface agent from byproducts and unreacted components. As illustrated in FIG. 2, two fractions provide surface agents of desirable molecular weight as indicated by the boiling point of the majority component. These two fractions are blended to provide a surface agent solution, referred to herein as 24 TMD.

Figure 3:
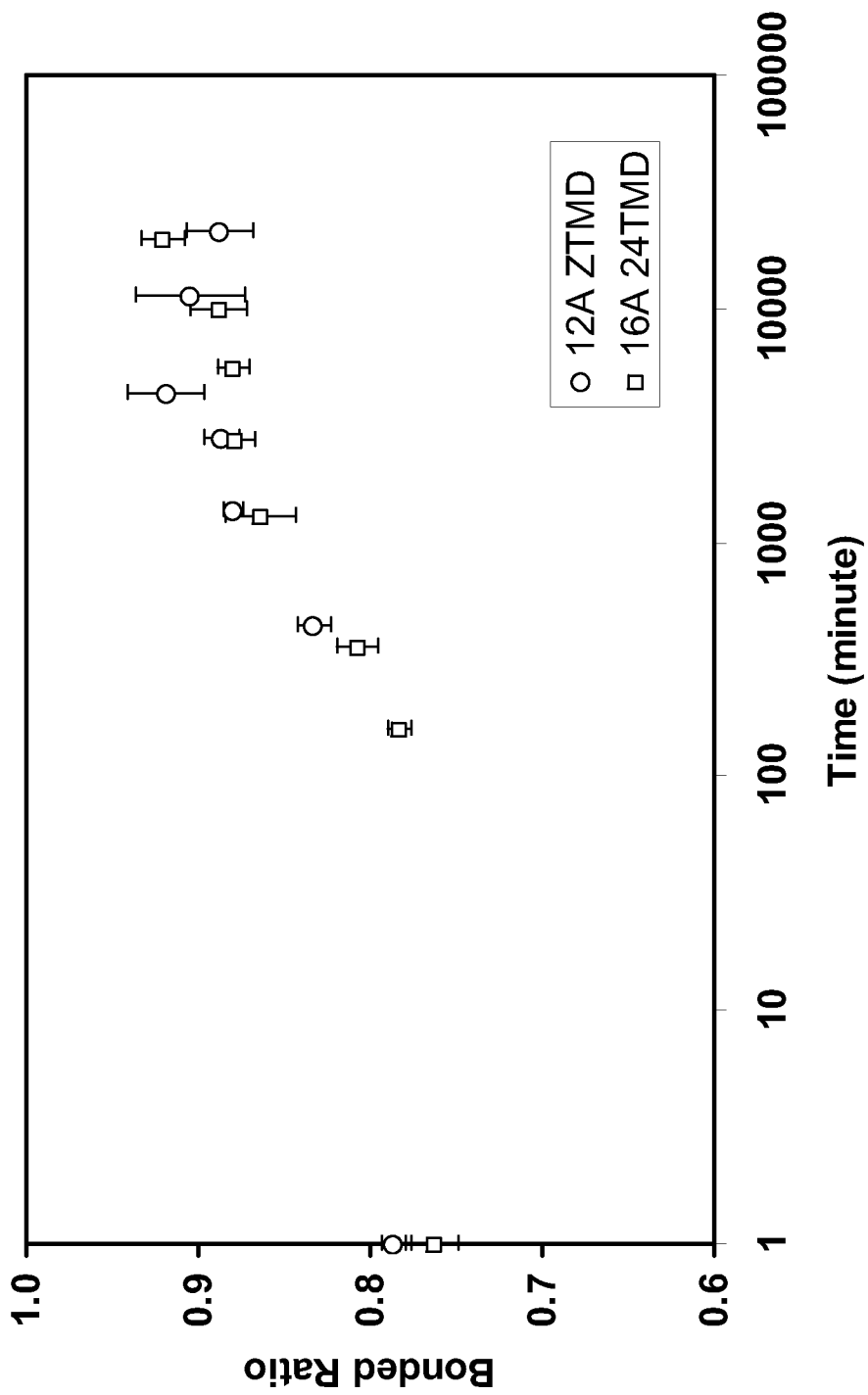
FIG. 3 includes a plot of bonding kinetics for an embodiment of a surface agent.

The surface agent solution is tested in comparison with ZTMD for Bonded Ratio, Clearance Index, and Durability Index. The film thickness is verified using calibrated FTIR analysis. Bonded ratio is the fraction of surface agent remaining on the surface after exposure to solvent such as 2,3-dihydroperfluoropentane. As illustrated in FIG. 3, the amount of surface agent that remains increases with longer exposure to ambient conditions (20° C. and 50% RH), stabilizing after approximately 1000 minutes around 90% for both ZTMD and 24 TMD.

Clearance Index is the difference in measured slider disk clearance relative to ZTMD coated surfaces. Disk clearance is measured in accordance with the method described by Guo et al., "Multidenate functionalized lubricant for ultralow head/disk spacing disk drive," *J. Applied Physics*, 100, 044306 (2006). As illustrated in Table 1, the Clearance Index of 24 TMD is approximately 0.7 nm, relative to ZTMD coated surface.

Durability Index is the time until a failure of a head observed during a touchdown stress test. The touchdown stress test is performed by flying a head over the surface of a coated disk. The coated disk includes a coating of one of ZTMD or 24 TMD (both at the same 12 Å thickness). During the test, the head is caused to touchdown at a rate of one touchdown per second through TFC. The length of time until head failure is recorded as the Durability Index. As illustrated in Table 1, ZTMD and 24 TMD exhibit similar Durability Index of approximately 4300 seconds.

TABLE 1

Comparative Lubricity of ZTMD and 24TMD

|  | ZTMD | 24TMD |
|---|---|---|
| Clearance Index (nm) | 0.0 | 0.7 |
| Durability Index (sec) | 4300 | 4300 |

As such, embodiments of the surface agent described above advantageously exhibits desirable properties. For example, the surface agent has a desirable viscosity and boiling point. In addition, the surface agent can have a desirable Durability Index and Bond Ratio. Further, the surface agent has a desirable Clearance Index.

This written description uses examples to disclose the embodiments, including the best mode, and also to enable those of ordinary skill in the art to make and use the invention. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Note that not all of the activities described above in the general description or the examples are required, that a portion of a specific activity may not be required, and that one or more further activities may be performed in addition to those described. Still further, the order in which activities are listed are not necessarily the order in which they are performed.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

After reading the specification, skilled artisans will appreciate that certain features are, for clarity, described herein in the context of separate embodiments, may also be provided in combination in a single embodiment. Conversely, various features that are, for brevity, described in the context of a single embodiment, may also be provided separately or in any subcombination. Further, references to values stated in ranges include each and every value within that range.

We claim:

1. A surface agent of the formula:

$R_e$—$R_m$—$R_e$ wherein the middle portion ($R_m$) includes

—$OCH_2CF_2CF_2CF_2O$—$(CF_2CF_2CF_2CF_2O)_n$—$CF_2CF_2CF_2CH_2O$— wherein n is at least 1;

wherein the end portions ($R_e$) are of the formula $R_t$—$R_z$—$R_i$ wherein the midsection ($R_z$) includes a segment —$OCH_2CF_2O$—$(CF_2CF_2O)_m$—$CF_2CH_2O$— wherein m is at least 1;

wherein the terminal section ($R_t$) includes at least one first surface active functional group, and wherein $R_i$ is an intermediate section bound between the midsection ($R_z$) of the end portions ($R_e$) and the middle portion ($R_m$), and wherein $R_i$ includes an alkyl or a fluoroalkyl and $R_i$ further includes at least one second surface active functional group.

2. The surface agent of claim 1, wherein n is in a range of 1 to 6.

3. The surface agent of claim 1, wherein m is in a range of 2 to 6.

4. The surface agent of claim 1, wherein the first surface active functional group is selected from the group consisting of a hydroxyl group, a piperonyl group, an amine group, a phosphazene group or a combination thereof.

5. The surface agent of claim 1, wherein the second surface active functional group is selected from the group consisting of a hydroxyl group, a piperonyl group, an amine group, a phosphazene group or a combination thereof.

6. The surface agent of claim 1, wherein the terminal section ($R_t$) includes $HOCHCH(OH)CH_2O$—.

7. The surface agent of claim 1, wherein the intermediate section $R_i$ includes

—$CH_2CH(OH)CH_2OCH_2CH(OH)CH_2$—.

* * * * *